June 24, 1969  F. L. THURSTONE  3,451,260
APPARATUS FOR ULTRASONIC SCANNING USING AN
ELLIPTIC REFLECTING SYSTEM
Filed March 23, 1966

INVENTOR
FREDRICK L. THURSTONE
BY
Cameron, Kerkam & Sutton
ATTORNEYS

United States Patent Office 3,451,260
Patented June 24, 1969

3,451,260
APPARATUS FOR ULTRASONIC SCANNING USING AN ELLIPTIC REFLECTING SYSTEM
Frederick L. Thurstone, Winston-Salem, N.C., assignor to the United States of America as represented by the Secretary of the Department of Health, Education, and Welfare
Filed Mar. 23, 1966, Ser. No. 536,744
Int. Cl. G01n 9/24
U.S. Cl. 73—67.9                                              4 Claims

ABSTRACT OF THE DISCLOSURE

An ultrasonic scanning system for ultrasonic scanning of an acoustical interface for biologic tissue utilizing a reflector formed from a portion of an ellipsoid with a transducer for transmitting and receiving located on the major axis of the ellipsoid. A second reflector diverges the plane wave front from the transducer back toward the first reflector for converting the plane wave front to a spherical wave front. Pulse generating means are connected to the transducer and also through a delay to a gate which connects to a display tube having linear motion means connection with the transducer.

---

The present invention relates generally to ultrasonic scanning and more particularly to apparatus for ultrasonic scanning using an elliptic reflecting system.

Ultrasonic energy has been used in echo ranging systems in biologic tissue for many years. One such system is shown in the U.S. Patent No. 2,763,153, and a comprehensive review of techniques used in this field is disclosed in Medical Electronics Biological Engineering, D. Gordon, volume 1, page 51, 1963. Although several ultrasonic scanning systems have been proposed which provide a two-dimensional image corresponding to the cross-section of a scanned interface, known scanning systems suffer from the disadvantages that they lack fine resolution and that they yield data which is difficult to interpret. These disadvantages are minimized by the present invention wherein a highly focused, ultrasonic multireflector system is used in conjunction with an electronic receiving system timed for the selection of particular echo information.

In one known form of an ultrasonic scanning system for generating a two-dimensional image, the image is produced by displaying the echoes received after an ultrasonic pulse has been transmitted along a line corresponding to the path of propagation of the pulse in the subject tissue. The transducer is then moved about the subject in some manner, and the two-dimensional image is generated by summation or these individual line elements. Because the duration of the ultrasonic pulse may be very short (less than 1 μsec.), improvement in resolution in the depth direction, or along the path of propagation of the ultrasonic beam may be achieved only at the expense of resolution in the lateral direction, due to operation in the Fresnel region.

Where resort is made to a focused transducer to improve resolution in the lateral direction at depths near the focal length of the transducer, resolution at distances removed from the focal region is adversely affected. One technique for such a focused transducer is to utilize only the echoes that return from the region of minimum beam size, that is, the focal point of a focused transducer. This system generates a two-dimensional image by scanning the transducer in two dimensions and generating the image point by point. Echoes returning from the focal point are selected on the basis of a known, discrete time of return to the transmitting transducer.

One restriction on such a system is that the focusing system for the transducer array requires that the length of the path of propagation from any point on the transducer surface to the target area must be constant. This, in turn, requires the use of a coupling medium between the transducer array and the tissue, which does not affect the focusing characteristics of the array. That is, the velocity of propagation in the subject tissue and the coupling medium between the transducer array and the tissue must be equal or nearly equal so as not to effect the focusing characteristics of the array. Another disadvantage of such a system is the requirement of a transducer large enough to produce a large solid angle of incidence convergent on the target area.

Accordingly, it is a primary object of the present invention to provide an improved apparatus for ultrasonic scanning which overcomes the disadvantages of known systems.

Another object of the present invention is to provide an improved apparatus for ultrasonic scanning of biologic tissue having highly improved resolution and tissue penetration characteristics.

Another object of the present invention is to provide improved apparatus for ultrasonic scanning which provides a wide angle of incidence from the scanning array.

In carrying out the present invention, in one illustrative form thereof, there is provided a highly focused ultrasonic multireflector system which operates in conjunction with an electronic receiving system having a visual display for the selection and presentation of particular echo information in the form of a two-dimensional image. To this end, there is provided a first reflector having an elliptic reflecting surface. The reflecting surface is illuminated by a second parabolic reflector whose focal point coincides with the focal point of the first reflector. Energy to the first focal point is propagated along the major axis of the first reflector by means of an unfocused transducer which generates a plane wave front. The parabolic reflector converts the plane wave front into a spherical wave front diverging from the focal point of the first reflector which converges the spherical wave front to the target focal point. A constant length of propagation path is maintained to the target and return and the returning energy is displayed by the receiving system in the form a a two-dimensional image.

While the specification concludes with claims particularly pointing out and distinctly claiming the subject matter regarding the invention, it is believed the invention will be more easily understood from the following description taken in connection with the accompanying drawing wherein like reference characters represent like parts throughout the several views.

Figure 1:
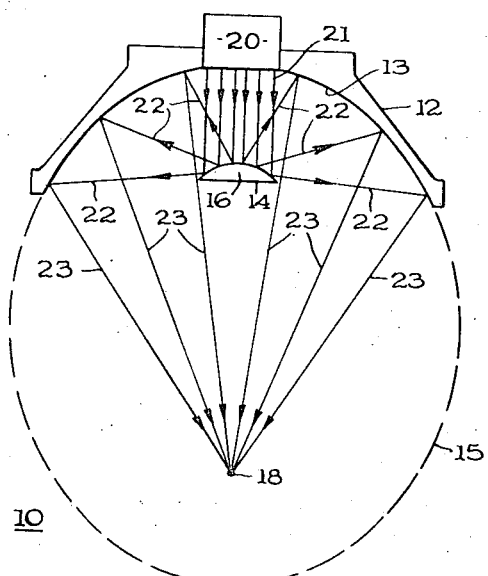
FIG. 1 is a diagrammatic cross-sectional view of the focusing system of the present invention, particularly illustrating the elliptic reflector and the propagation paths of the supersonic wave front.

Referring to the drawing, and in particular to FIG. 1, reference character 10 generally designates the multireflector scanning system comprising a pair of reflectors 12 and 14. Reflector 12 may be formed from any suitable reflecting materials such as, for example, brass to provide a curved reflecting surface 13. The curved reflecting surface is a section of a prolate spheroid which yields an elliptic section in two dimensions. For clarity, the elliptical nature of the reflecting surface is illustrated by the outer boundary of an imaginary ellipse represented by the dash lines 15 in FIG. 1. Thus, reflector 12 has two focal points 16 and 18. Focal point 16 defines the location of the second reflector 14 which is a paraboloidal reflector made of acoustical reflecting material such as, for example, brass, and focal point 18 defines the target location or location of the interface adapted to be scanned. To avoid the possibility of confusion of focal points, when reference is hereinafter made to focal point 18, it will be referred to as the target focal point.

The paraboloidal reflector 14 may be supported from the edge of the spheroidal section by means of three stainless steel struts (not shown) so that its focal point coincides with the focal point 16 of reflector 12. A transducer 20 indicated in block form is located along the major axis of the reflector 12 and adapted to be energized to propagate a plane wave front represented by lines 21 along the major axis toward the paraboloidal reflector 14. The transducer may be a conventional unfocused piezoelectric device operating in the supersonic range. Such piezoelectric devices are well known in the art. In the preferred embodiment of the invention transducer 20 comprises a single piezoelectric crystal having a diameter of approximately 0.5 in. arranged to be excited at a frequency of 2.25 mc./sec.

The plane wave front generated by the unfocused transducer 20 and propagated along the major axis of the reflector 12 is converted by the paraboloidal reflector 14 into a spherical wave front represented by lines 22 diverging from the focal point 16 and directed toward the reflecting surface 13 of reflector 12. The elliptical reflecting surface 13 converges the energy of the spherical wave front to the target focal point 18 through a large solid angle indicated by lines 23. By reciprocity, echoes from the target focal point are returned along a similar propagation path and the elliptic reflecting surface serves to maintain a constant length of propagation path to the target and return.

The maintenance of a constant length of propagation path to the target and return is based on the properties of the elliptical reflecting surface. Two fundamental properties of an ellipse are that any ray emanating from one focal point of the ellipse will be reflected to the second focal point of the ellipse and that the distance travelled by the ray from the first focal point to the second focal point by such a reflection is independent of the path of propagation. If a mechanical interface of some type exists at the second focal point of the ellipse and energy is reflected by the elliptical surface to the second point from the first focal point, then a portion of this reflected energy will be reflected back to the initial focal point. Although the angle of the reflection may not be directly related to the angle of incident energy, the returning energy will appear to emanate from the second focal point and will be reflected by the elliptic surface to the first focal point and the length of the return path from the second focal point to the first focal point is independent of the angle of reflection. That is, the length of the propagation path from the first focal point to the second focal point is the same as that of the return energy from the second focal point to the first focal point.

Thus, rays of energy which are transmitted from the first focal point at time $t$ and which strike an interface located at the second focal point will be reflected from the second focal point back to the first focal point and will arrive at the same time regardless of either the path of transmitted propagation or the path of reflected propagation. The reflections from the second focal point will be returned at a particular discrete time after the transmission of a sounding pulse from the first focal point and the total propagation time is equal to twice the time it takes the sounding pulse to reach the second focal point.

Applying the principles to the present invention, it will be seen that an ultrasonic pulse emanating from focal point 16 due to excitation of the supersonic transducer 20 will be reflected from the elliptic reflecting surface 13 toward the target focal point 18. An ultrasonic echo will be received at a time proportional to twice the distance of a single path of propagation from focal point 16 to target focal point 18 if, and only if, a mechanical interface exists at the target focal point.

The transmitting piezoelectric transducer 20 is also used as a receiving element as is well known in the art, and in conjunction with a receiving system arranged to be in operation only during a time that an echo would be received, provides pulses for a visual display of the scanned target. To this end, the receiver system is time gated to pass only those returning signals which arrive at the particular and discrete time which is related to the existence or non-existence of a mechanical interface at the target focal point.

The target area is scanned in two directions by transporting the transducer 20 in two directions. Any suitable mechanical means may be utilized to effect the two-dimensional scanning of the target area so that returning energy from the elliptic ultrasonic scanning system corresponds to a two-dimensional pattern of the scanned mechanical interface. A two-dimensional visual presentation is made available by means of a storage type display tube 24 wherein the electron beam of the display tube is intensified at a position corresponding to the presence of a reflecting interface and is not intensified at a position corresponding to the absence of a reflecting interface at the target focal point.

It should be apparent that the target focal point can be at a depth in the interface approximately equal to the displacement between the focal points of the elliptical reflecting surface. By virtue of the multireflecting system, the energy generated by the transducer is focused or concentrated at the target focal point making the system particularly well adapted for scanning of biologic tissue and obtaining relatively thin sectional images of the scanned target having a resolution within one millimeter.

Figure 2:
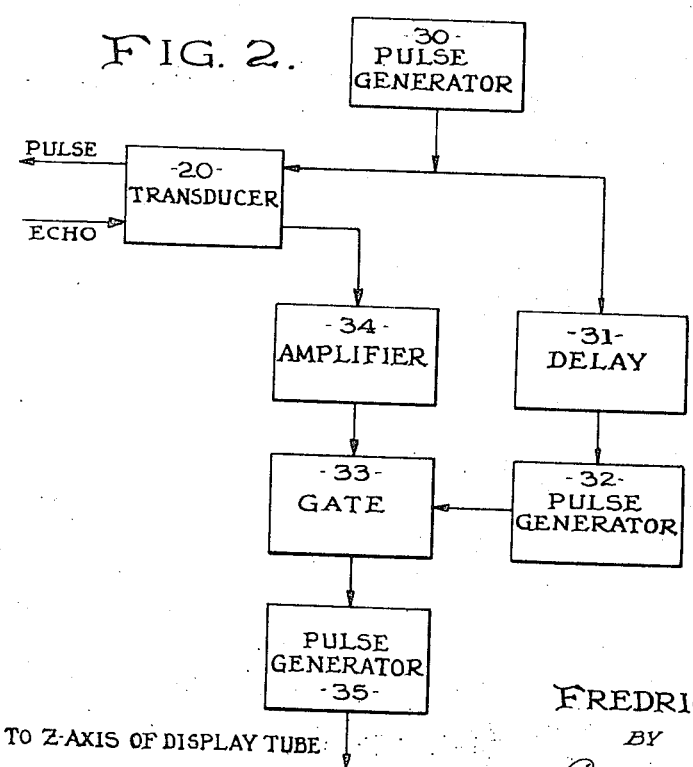
FIG. 2 is a block diagram of a representative receiving system used in conjunction with the scanning system of the present invention.

Referring to FIG. 2, there is illustrated in block diagram form a representative electronic receiving system which can be used in conjunction with the multireflector ultrasonic scanning system to effect presentation of the two-dimensional image of the scanned target area. As heretofore described, the ultrasonic transducer generates an unfocused plane wave front at its design frequency which lies within the supersonic range. The transducer 20 is controlled by pulse generator 30 which delivers a series of short current pulses to excite the transducer and corresponding pulses to delay network 31 which provides an output delay pulse corresponding to the focal length of the reflector. The delay pulse from network 31 triggers a target window pulse generator 32. The output of the target window pulse generator has a short time duration relative to the delay pulse and is applied as one input to a two input electronic gate 33. The other input to the electronic gate corresponds to received echo information received at transducer 20 and amplified by the receiver amplifier 34. Upon the presence of echo information, an output signal from the gate 33 triggers the image intensification pulse generator 35 to provide an image intensification pulse corresponding to the gated echo energy. This image intensification pulse is applied to the Z axis of the display tube 24 for intensifying the electron beam at the position corresponding to the presence of a reflecting interface.

Figure 4:
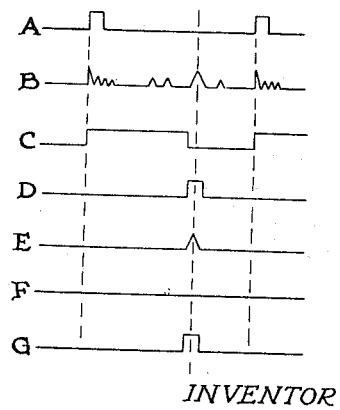
FIG. 4 is a diagram of the timing sequence for time gating the receiving system.

The make-up of the individual electrical circuits or stages are well known in the art and will not be described in detail; however, for a better understanding of the time sequence of the electrical signals of the various stages, reference should be made to FIG. 4 wherein: line A represents the output of the pulse generator 30; line B represents the received pulses and corresponds to the output of the receiver amplifier 34; line C represents the output of the delay network 31; line D represents the output of the target window pulse generator 32; line E represents the output of gate 33 when echo energy is received simultaneously with the output of the target window pulse generator; line F represents the output of gate 33 when no echo information is received and line G represents the output of the image intensification pulse generator 35.

It should be apparent by comparison of lines A and G of FIG. 4 that the time between the first exciting pulse from pulse generator 30 and the occurrence of the image intensification pulse from pulse generator 35 corresponds to the total propagation time of energy from the transducer to the target focal point and return, and that the image inensification pulse generator 35 has an output if, and only if, a reflecting interface exists at the target focal point.

Figure 3:
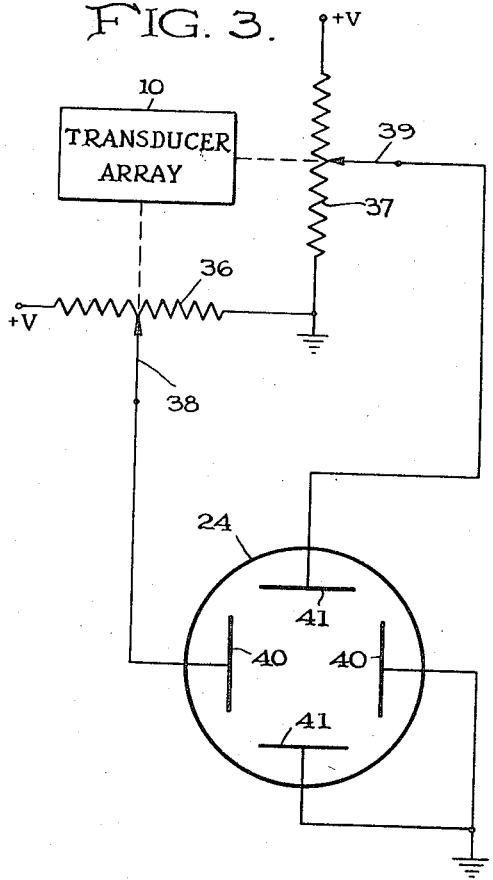
FIG. 3 is a diagrammatic view of the visual display means.

Referring to FIG. 3, there is illustrated diagrammatically the manner in which the information related to the transportation of the transducer 20 is applied to the image storage tube. To this end, there are provided a pair of linear-motion potentiometers 36 and 37 which have their movable arms 38 and 39, respectively, ganged to the mechanical system for transporting the transducer 20. One end of each of the potentiometers is commonly connected and returned to ground potential, while the other ends are returned to a positive supply. This establishes the proper deflection voltages for the display tube 24 which includes the usual sets of X axis and Y axis deflection plates 40 and 41. Adjustment of the deflection voltages is automatically made by connecting arm 38 to the X axis deflection plates and arm 39 to the Y axis deflection plates. In this manner, when transducer 20 is transported, arms 38 and 39 are correspondingly adjusted which results in a change in voltage applied to the deflection plates of the display tube so that the position information is at all times applied to the image display.

There has thus been described a novel ultrasonic multireflector scanning system which provides improved resolution and tissue penetration by using a highly focused ultrasonic scan in conjunction with an electronic receiving system timed for the selection of echo information. The scanning system accomplishes the objects of focusing a plane wave to a point, maintaining a constant length of propagation path to the target and return, and converging the energy to the target point through a large solid angle. Prior to converging the energy to the target focal point, the plane wave front is converted into a spherical wave front diverging from the focal point of the elliptical reflector. In this manner, it has been possible to obtain system resolution within one millimeter.

What is claimed is:

1. A multireflector ultrasonic scanning system for ultrasonic scanning of an acoustical interface comprising
    first reflector means having a first and a second focal point and formed of an elliptical section in two dimensions;
    transducer means to transmit a plane wave front located in a plane normal to the major axis of said reflector means;
    means to maintain a constant length of propagation path between said transducer means to said second focal point and returning to said transducer means including
        said first reflector means, and a second reflector means to direct said wave front towards said first reflector means and to convert said plane wave front to a spherical wave front, located at said first focal point;
    and an electronic pulsing and time gating system electrically connected to said transducer means.

2. The ultrasonic scanning system of claim 1, wherein said second reflector means is a parabolic reflector.

3. The ultrasonic scanning system of claim 1, further characterized by
    said electronic pulsing and time gating system including
        pulse generating means connected to said transducer means to generate a pulse transmitted by said transducer means,
        delay means connected to said pulse generating means to receive a pulse therefrom and delay said pulse,
        gating means connected to receive a return pulse received by said transducer means and a delayed pulse from said delay means,
        and display means connected to said gating means to receive a pulse when said gating means receives both a return pulse and a delayed pulse.

4. The ultrasonic scanning system of claim 1, further characterized by
    said transducer means and said first reflector means connected for combined movement thereof;
    and display means including
        viewing tube means,
        and linear motion means operatively connected to said transducer means and said viewing tube means for providing position information from said transducer means to said viewing tube means.

References Cited

UNITED STATES PATENTS

| | | | |
|---|---|---|---|
| 3,251,219 | 5/1966 | Hertz et al. | 73—67.7 |
| 3,262,307 | 7/1966 | Hart | 73—71.5 |

RICHARD C. QUEISSER, *Primary Examiner.*

J. P. BEAUCHAMP, *Assistant Examiner.*

U.S. Cl. X.R.

73—71.5; 310—8.7; 340—8